US011010155B2

(12) United States Patent
Sun

(10) Patent No.: US 11,010,155 B2
(45) Date of Patent: May 18, 2021

(54) PROMPTED USE OF AN INSTALLED LATEST VERSION AFTER A PRESET TIME

(71) Applicant: JRD Communication (Shenzhen) LTD., Shenzhen (CN)

(72) Inventor: Jipeng Sun, Shenzhen (CN)

(73) Assignee: JRD Communication (Shenzhen) LTD., Shenzhen (CN)

(*) Notice: Subject to any disclaimer, the term of this patent is extended or adjusted under 35 U.S.C. 154(b) by 0 days.

(21) Appl. No.: 16/640,358

(22) PCT Filed: Aug. 21, 2018

(86) PCT No.: PCT/CN2018/101588
§ 371 (c)(1),
(2) Date: Feb. 20, 2020

(87) PCT Pub. No.: WO2019/037724
PCT Pub. Date: Feb. 28, 2019

(65) Prior Publication Data
US 2020/0174775 A1 Jun. 4, 2020

(30) Foreign Application Priority Data
Aug. 21, 2017 (CN) .......................... 201710719709.0

(51) Int. Cl.
*G06F 8/65* (2018.01)
*G06F 8/61* (2018.01)
(Continued)

(52) U.S. Cl.
CPC .................. *G06F 8/65* (2013.01); *G06F 8/62* (2013.01); *G06F 8/71* (2013.01); *H04M 1/72406* (2021.01)

(58) Field of Classification Search
CPC ...... G06F 8/60–66; G06F 8/71; G06F 3/1225; G06F 3/123; H04M 1/72525; H04M 1/72406
See application file for complete search history.

(56) References Cited

U.S. PATENT DOCUMENTS 7,739,681 B2 * 6/2010 Sinha .................. G06F 8/61
717/173
8,819,666 B2 * 8/2014 Powell .................. G06F 8/65
717/170
(Continued)

FOREIGN PATENT DOCUMENTS

CN 103440147 12/2013
CN 106843951 4/2015
(Continued)

OTHER PUBLICATIONS

International Search Report and the Written Opinion dated Nov. 8, 2018 From the International Searching Authority Re. Application No. PCT/CN2018/101588 and Its Translation of Search Report Into English. (10 Pages).

*Primary Examiner* — Todd Aguilera

(57) ABSTRACT

An application upgrade method of a mobile terminal includes: acquiring an update installation package of an application required to be upgraded; modifying a unique identification of an application having a latest version; installing the application having the latest version, and generating a prompt window after a preset time for prompting whether to use the application having the latest version; if yes, controlling the application having an old version to be uninstalled and retaining the application having the latest version; and if no, controlling the application having the latest version to be uninstalled and retaining the application having the old version, when it is decided not to use the
(Continued)

application having the latest version. A storage device and a mobile terminal are also provided.

20 Claims, 2 Drawing Sheets

(51) Int. Cl.
*G06F 8/71* (2018.01)
*H04M 1/72406* (2021.01)

(56) References Cited

U.S. PATENT DOCUMENTS

| | | | |
|---|---|---|---|
| 2007/0006219 A1* | 1/2007 | Sinha | G06F 8/61 717/174 |
| 2013/0232229 A1* | 9/2013 | Firman | G06F 8/61 709/219 |
| 2014/0026129 A1* | 1/2014 | Powell | G06F 8/656 717/170 |
| 2017/0017480 A1* | 1/2017 | Zhang | H04L 67/26 |

FOREIGN PATENT DOCUMENTS

| | | |
|---|---|---|
| CN | 104503790 | 6/2017 |
| CN | 107066294 | 8/2017 |
| CN | 107479933 | 12/2017 |
| WO | WO 2012/025011 | 11/2018 |
| WO | WO 2019/037724 | 2/2019 |

\* cited by examiner

PROMPTED USE OF AN INSTALLED LATEST VERSION AFTER A PRESET TIME

RELATED APPLICATIONS

This application is a National Phase of PCT Patent Application No. PCT/CN2018/101588 having International filing date of Aug. 21, 2018, which claims the benefit of priority of Chinese Patent Application No. 201710719709.0 filed on Aug. 21, 2017. The contents of the above applications are all incorporated by reference as if fully set forth herein in their entirety.

FIELD AND BACKGROUND OF THE INVENTION

The present disclosure relates to a technology field of mobile terminals, and more particularly to an application upgrade method of a mobile terminal, a storage device, and a mobile terminal.

With the rapid popularization of mobile terminals, the mobile terminals have become an essential tool of production, entertainment, and communication in people's daily life. The mobile terminals provide convenience for the people's life so much.

To meet users' various requirements, many applications are usually installed on the mobile terminals. Versions and performance of the applications are continuously optimized, and the applications need to be upgraded and updated. In the prior art, when a user finds that an application has an upgradeable version, the user basically performs an update operation. After the update operation is performed, the application having an old version is overwritten. However, some mobile terminals are not fully compatible with a latest version after the application is upgraded. Accordingly, a problem that the application cannot be used or cannot be operated conveniently after being updated occurs. The user needs to uninstall the application having the latest version and to re-download the application having the old version. This leads to data loss. Furthermore, in a general condition, after the application having the latest version is released, the application having the old version is discontinued and the user cannot download the application having the old version anymore. As such, it is not convenient for the user.

Consequently, the prior art needs to be improved and developed.

SUMMARY OF THE INVENTION

Embodiments of the present disclosure provide an application upgrade method of a mobile terminal, a storage device, and a mobile terminal capable of solving the problem of data loss in the prior art. The problem is that a user needs to uninstall an application having a latest version and to re-download the application having an old version after the application is updated but the application cannot be used.

In a first aspect, an embodiment of the present disclosure provides an application upgrade method of a mobile terminal, wherein the method includes:

acquiring an update installation package of an application required to be upgraded and analyzing the update installation package by the mobile terminal;

acquiring an upgrade configuration file and an installation directory from the update installation package, modifying a unique identification of an application having a latest version, and adjusting a file level in the installation directory;

installing the application having the latest version, and generating a prompt window after a preset time for prompting whether to use the application having the latest version;

controlling the application having an old version to be uninstalled and retaining the application having the latest version, when it is decided to use the application having the latest version; and uninstalling the application having the latest version and retaining the application having the old version, when it is decided not to use the application having the latest version.

In the application upgrade method of the mobile terminal, the unique identification is configured to identify the application in the mobile terminal, and different applications have different unique identifications.

In the application upgrade method of the mobile terminal, before the steps of acquiring the update installation package of the application required to be upgraded and analyzing the update installation package by the mobile terminal, the application upgrade method further includes:

acquiring a version number of the installed application regularly and determining whether it is necessary to upgrade the application required to be upgraded according to the version number of the application by the mobile terminal.

In the application upgrade method of the mobile terminal, the steps of acquiring the update installation package of the application required to be upgraded and analyzing the update installation package by the mobile terminal specifically include:

prompting a name of the application required to be upgraded for a user, when the mobile terminal determines that the application which has been installed on the mobile terminal is required to be upgraded;

receiving an operational command from the user and downloading the update installation package of the application required to be upgraded by the mobile terminal; and analyzing the downloaded update installation package.

In the application upgrade method of the mobile terminal, the steps of acquiring the upgrade configuration file and the installation directory from the update installation package, modifying the unique identification of the application having the latest version, and adjusting the file level in the installation directory specifically include:

acquiring the upgrade configuration file and the installation directory of the application having the latest version by analyzing the update installation package;

acquiring the unique identification configured to identify the application having the latest version from the upgrade configuration file, and modifying the unique identification of the application having the latest version; and acquiring the installation directory of the application having the latest version from the upgrade configuration file, and adjusting the file level in the installation directory, so that the application having the latest version and the application having the old version are distinguished from each other and do not conflict with each other.

In the application upgrade method of the mobile terminal, the steps of installing the application having the latest version, and generating the prompt window after the preset time for prompting whether to use the application having the latest version specifically include:

setting the preset time;

installing the application having the latest version based on the modified upgrade configuration file; and generating the prompt window after the preset time for prompting a user whether to use the application having the latest version.

In the application upgrade method of the mobile terminal, the steps of controlling the application having the old version to be uninstalled and retaining the application having the latest version, when it is decided to use the application having the latest version, and the steps of uninstalling the application having the latest version and retaining the application having the old version, when it is decided not to use the application having the latest version specifically include:

uninstalling the application having the old version and retaining the application having the latest version, when a user decides to use the application having the latest version; and uninstalling the application having the latest version and retaining the application having the old version, when the user decides not to use the application having the latest version.

In the application upgrade method of the mobile terminal, the steps of uninstalling the application having the old version and retaining the application having the latest version, when the user decides to use the application having the latest version specifically include:

overwriting the application having the old version with the application having the latest version totally, when the user decides to use the application having the latest version, so that the mobile terminal retains the application having the latest version.

In a second aspect, an embodiment of the present disclosure provides a storage device storing instructions, wherein the instructions are loaded and executed by a processor to perform steps of:

acquiring an update installation package of an application required to be upgraded and analyzing the update installation package by the mobile terminal;

acquiring an upgrade configuration file and an installation directory from the update installation package, modifying a unique identification of an application having a latest version, and adjusting a file level in the installation directory;

installing the application having the latest version, and generating a prompt window after a preset time for prompting whether to use the application having the latest version;

controlling the application having an old version to be uninstalled and retaining the application having the latest version, when it is decided to use the application having the latest version; and uninstalling the application having the latest version and retaining the application having the old version, when it is decided not to use the application having the latest version.

In the storage device, the steps of acquiring the update installation package of the application required to be upgraded and analyzing the update installation package by the mobile terminal specifically include:

prompting a name of the application required to be upgraded for a user, when the mobile terminal determines that the application which has been installed on the mobile terminal is required to be upgraded;

receiving an operational command from the user and downloading the update installation package of the application required to be upgraded by the mobile terminal; and analyzing the downloaded update installation package.

In the storage device, the steps of acquiring the upgrade configuration file and the installation directory from the update installation package, modifying the unique identification of the application having the latest version, and adjusting the file level in the installation directory specifically include:

acquiring the upgrade configuration file and the installation directory of the application having the latest version by analyzing the update installation package;

acquiring the unique identification configured to identify the application having the latest version from the upgrade configuration file, and modifying the unique identification of the application having the latest version; and acquiring the installation directory of the application having the latest version from the upgrade configuration file, and adjusting the file level in the installation directory, so that the application having the latest version and the application having the old version are distinguished from each other and do not conflict with each other.

In the storage device, the steps of installing the application having the latest version, and generating the prompt window after the preset time for prompting whether to use the application having the latest version specifically include:

setting the preset time;

installing the application having the latest version based on the modified upgrade configuration file; and generating the prompt window after the preset time for prompting a user whether to use the application having the latest version.

In a third aspect, an embodiment of the present disclosure provides a mobile terminal comprising a processor and a storage device communicating with and connected to the processor, wherein the storage device is configured to store instructions, and the processor is configured to call the instructions in the storage device to perform steps of:

acquiring an update installation package of an application required to be upgraded and analyzing the update installation package by the mobile terminal;

acquiring an upgrade configuration file and an installation directory from the update installation package, modifying a unique identification of an application having a latest version, and adjusting a file level in the installation directory, wherein the unique identification is replaced by a Package Manager Service;

installing the application having the latest version, and generating a prompt window after a preset time for prompting whether to use the application having the latest version;

controlling the application having an old version to be uninstalled and retaining the application having the latest version, when it is decided to use the application having the latest version; and uninstalling the application having the latest version and retaining the application having the old version, when it is decided not to use the application having the latest version.

In the mobile terminal, the step of modifying the unique identification of the application having the latest version specifically includes:

prefixing a package name of the application having the latest version with a timestamp string, so that the package name of the application having the latest version and a package name of the application having the old version are not repeated and do not conflict with each other.

In the mobile terminal, before the steps of acquiring the update installation package of the application required to be upgraded and analyzing the update installation package by the mobile terminal, the processor is further configured to call the instructions in the storage device to perform:

acquiring a version number of the installed application regularly and determining whether it is necessary to upgrade the application required to be upgraded according to the version number of the application by the mobile terminal.

In the mobile terminal, the steps of acquiring the update installation package of the application required to be upgraded and analyzing the update installation package by the mobile terminal specifically include:

prompting a name of the application required to be upgraded for a user, when the mobile terminal determines that the application which has been installed on the mobile terminal is required to be upgraded;

receiving an operational command from the user and downloading the update installation package of the application required to be upgraded by the mobile terminal; and analyzing the downloaded update installation package.

In the mobile terminal, the steps of acquiring the upgrade configuration file and the installation directory from the update installation package, modifying the unique identification of the application having the latest version, and adjusting the file level in the installation directory specifically include:

acquiring the upgrade configuration file and the installation directory of the application having the latest version by analyzing the update installation package;

acquiring the unique identification configured to identify the application having the latest version from the upgrade configuration file, and modifying the unique identification of the application; and acquiring the installation directory of the application having the latest version from the upgrade configuration file, and adjusting the file level in the installation directory, so that the application having the latest version and the application having the old version are distinguished from each other and do not conflict with each other.

In the mobile terminal, the steps of installing the application having the latest version, and generating the prompt window after the preset time for prompting whether to use the application having the latest version specifically include:

setting the preset time;

installing the application having the latest version based on the modified upgrade configuration file; and generating the prompt window after the preset time for prompting a user whether to use the application having the latest version.

In the mobile terminal, the step of controlling the application having an old version to be uninstalled and retaining the application having the latest version, when it is decided to use the application having the latest version, and the operation of uninstalling the application having the latest version and retaining the application having the old version, when it is decided not to use the application having the latest version specifically include:

uninstalling the application having the old version and retaining the application having the latest version, when a user decides to use the application having the latest version; and uninstalling the application having the latest version and retaining the application having the old version, when the user decides not to use the application having the latest version.

In the mobile terminal, the step of uninstalling the application having the old version and retaining the application having the latest version, when the user decides to use the application having the latest version specifically includes:

overwriting the application having the old version with the application having the latest version totally, when the user decides to use the application having the latest version, so that the mobile terminal retains the application having the latest version.

Advantageous effect is described as follows. In the present disclosure, the upgrade configuration file and the installation directory are acquired from the update installation package. The unique identification of the application having the latest version is modified. The file level in the installation directory is adjusted. The application having the latest version and the application having the old version are distinguished from each other and do not conflict with each other. The application having the latest version can be served as a new application and installed. The application having the old version is uninstalled only when the user determines to use the application having the latest version in a long term. As such, the data loss can be avoided. Furthermore, the user can autonomously decide whether to continue to user the application having the latest version. This provides convenience for the user.

DESCRIPTION OF SPECIFIC EMBODIMENTS OF THE INVENTION

To make the objectives, technical schemes, and technical effect of the present disclosure more clearly and definitely, the present disclosure will be described in details below by using embodiments in conjunction with the appending drawings. It should be understood that the specific embodiments described herein are merely for explaining the present disclosure but not intended to limit the present disclosure.

Figure 1:
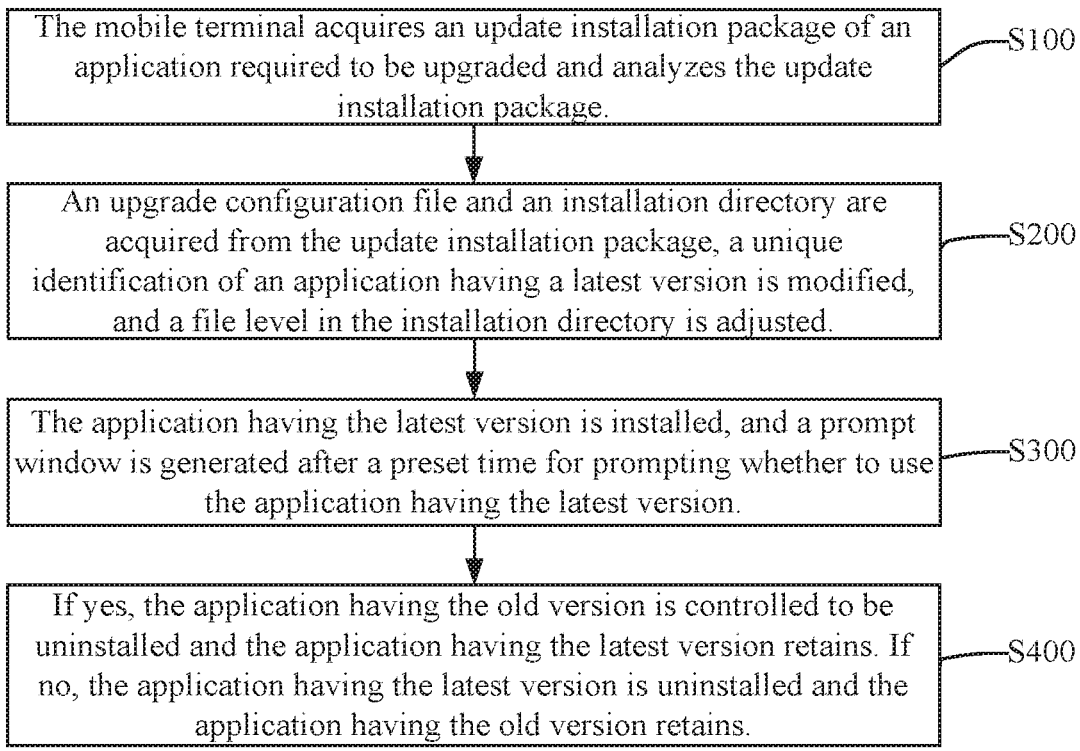
FIG. 1 illustrates a flow chart of a preferred embodiment of an application upgrade method of a mobile terminal provided by the present disclosure.

As shown in FIG. 1, FIG. 1 illustrates a flow chart of a preferred embodiment of an application upgrade method of a mobile terminal provided by the present disclosure. The application upgrade method of the mobile terminal includes the following steps.

In step S100, the mobile terminal acquires an update installation package of an application required to be upgraded and analyzes the update installation package.

Preferably, step S100 specifically includes the following steps.

In step S101, when the mobile terminal determines that the application which has been installed on the mobile terminal is required to be upgraded, the mobile terminal prompts a name of the application required to be upgraded for a user.

In step S102, the mobile terminal receives an operational command from the user and downloads the update installation package of the application required to be upgraded.

In step S103, the downloaded update installation package is analyzed.

In a specific implementation, in order to make the user understand rapidly and conveniently whether the application which has been installed on the mobile terminal is upgradable, the mobile terminal is preset to acquire and record a version number of the installed application regularly and determines whether it is necessary to upgrade the application required to be upgraded according to the version number of the application. When the mobile terminal determines that the installed application is required to be upgraded, the mobile terminal prompts the name of the application for the user. The user can select whether to perform an upgrade operation. Preferably, an operation interface can be disposed in the mobile terminal of the present disclosure. The application required to be upgraded is displayed in the operation interface. The user can check to decide whether to perform the upgrade operation. When the mobile terminal receives the operational command from the user, the update installation package of the application required to be upgraded is downloaded and the downloaded update installation package is analyzed.

In step S200, an upgrade configuration file and an installation directory are acquired from the update installation package, a unique identification of an application having a latest version is modified, and a file level in the installation directory is adjusted.

Preferably, step S200 specifically includes the following steps.

In step S201, the upgrade configuration file and the installation directory of the application having the latest version are acquired by analyzing the update installation package.

In step S202, the unique identification configured to identify the application having the latest version is acquired from the upgrade configuration file, and the unique identification of the application is modified.

In step S203, the installation directory of the application having the latest version is acquired from the upgrade configuration file, and the file level in the installation directory is adjusted, so that the application having the latest version and the application having an old version are distinguished from each other and do not conflict with each other.

In a specific implementation, the mobile terminal analyzes the update installation package. The upgrade configuration file and the installation directory of the application having the latest version are acquired by analyzing the update installation package. The unique identification configured to identify the application having the latest version is acquired from the upgrade configuration file, and the unique identification of the application is modified. The unique identification is configured to identify the application in the mobile terminal. Different applications have different unique identifications. Generally speaking, the application in the mobile terminal has a unique identification. For example, a package name of the application is com.test.jp. Plural applications having the same package name cannot be allowed to be installed on the same mobile terminal. The installation and the used directory of the application are basically determined by the unique identification. Accordingly, the unique identification having the latest version should be modified, so that the application having the latest version and the application having the old version do not conflict with each other. When the unique identification having the latest version is not modified, the application having the latest version cannot be installed due to the conflict before the application having the old version is uninstalled. For example, a version number of WeChat installed on the mobile terminal is 6.5.8. A version number of the latest version is 6.5.10. When the unique identification of WeChat having the latest version is not modified, WeChat having the latest version overwrites WeChat having the old version. WeChat having the latest version and WeChat having the old version cannot coexist.

Preferably, in the present disclosure, the unique identification is replaced by a management process (e.g., a Package Manager Service). For example, the package name of the application having the latest version is prefixed with a timestamp string, so that the package name of the application having the latest version and the package name of the application having the old version are not repeated and do not conflict with each other. The application having the latest version can be served as a new application and be installed on the mobile terminal. That is, in the method of the present disclosure, the application having the latest version and the application having the old version can coexist. A situation that the application having the latest version overwrites the application having the old version after the application having the latest version is installed does not occur. As such, data loss can be avoided, and it is convenient for the user.

Preferably, the present disclosure further needs to adjust the installation directory of the application having the latest version to increase the file level, thereby distinguishing the application having the latest version from the application having the old version. Certainly, since the installation directory depends on the unique identification of the application, adjusting the unique identification of the application having the latest version equates to adjusting the installation directory. As such, it is not necessary to modify to the application having the latest version.

In step S300, the application having the latest version is installed, and a prompt window is generated after a preset time for prompting whether to use the application having the latest version.

Preferably, step S300 specifically includes the following steps.

In step S301, the preset time is set.

In step S302, the application having the latest version is installed based on the modified upgrade configuration file.

In step S303, the prompt window is generated after the preset time for prompting the user whether to use the application having the latest version.

In a specific implementation, after the unique identification and the installation directory of the application having the latest version are modified, the application having the latest version is installed. In the meantime, the application having the latest version and the application having the old version can coexist in the mobile terminal. In order to provide better user experience for the user and improve intelligence of the mobile terminal, the preset time is set in advance in the present disclosure, and the prompt window is generated after the preset time for prompting the user whether to decide to use the application having the latest version. Preferably, the user is prompted after a week. For example, after the user installs WeChat having the latest version and uses WeChat for a week, the mobile terminal pops up a dialogue box to prompt the user whether to decide to user the WeChat having the latest version. This provides convenience for the user.

In step S400, if yes, the application having the old version is controlled to be uninstalled and the application having the latest version retains. If no, the application having the latest version is uninstalled and the application having the old version retains.

Preferably, step S400 specifically includes the following steps.

In step S401, when the user decides to use the application having the latest version, the application having the old version is uninstalled and the application having the latest version retains.

In step S402, when the user decides not to use the application having the latest version, the application having the latest version is uninstalled and the application having the old version retains.

In a specific implementation, when the user uses the application having the latest version in the preset time and feels that effect of using the application having the latest version is better, the user can decide to use the application having the latest version. The mobile terminal uninstalls the application having the old version automatically and retains the application having the latest version, thereby implementing the complete upgrade of the application. Preferably, when the user decides to use the application having the latest version, the mobile terminal overwrites the application having the old version with the application having the latest version automatically and totally. In contrast, when the user feels that the application having the latest version is not more convenient than the application having the old version after being used, the user can decide not to use the application having the latest version. The application having the latest version is uninstalled, and the application having the old version retains. In a general condition, after the latest version is released, the old version is discontinued. The user cannot download the old version anymore. In the present disclosure, the application having the old version is not overwritten after the application having the latest version is installed. Furthermore, when the application cannot be used after being updated or the application is not used conveniently, it is necessary to uninstall the application having the latest version and to re-download the application having the old version. The present disclosure can avoid the problem of data loss due to this situation.

Figure 2:
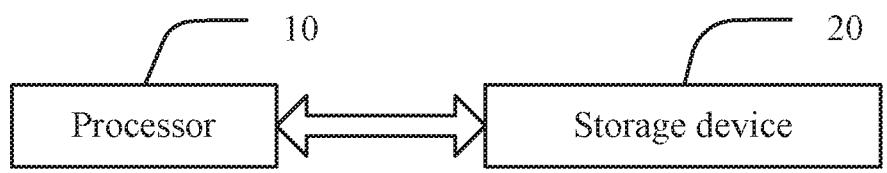
FIG. 2 illustrates a functional principle diagram of a preferred embodiment of a mobile terminal provided by the present disclosure.

Based on the above-mentioned embodiment, the present disclosure further provides a mobile terminal as shown in FIG. 2. The mobile terminal includes a processor 10 and a storage device (memory) 20. The processor 10 is configured to call program instructions in the storage device 20 to perform the method provided by the above-mentioned embodiment. For example, the method includes:

acquiring an update installation package of an application required to be upgraded and analyzing the update installation package by the mobile terminal;

acquiring an upgrade configuration file and an installation directory from the update installation package, modifying a unique identification of an application having a latest version, and adjusting a file level in the installation directory;

installing the application having the latest version, and generating a prompt window after a preset time for prompting whether to use the application having the latest version;

controlling the application having an old version to be uninstalled and retaining the application having the latest version, when it is decided to use the application having the latest version; and uninstalling the application having the latest version to be uninstalled and retaining the application having the old version, when it is decided not to use the application having the latest version.

The present disclosure further provides a storage device. The storage device stores computer instructions. The computer instructions are executed by a computer to perform the method provided by the above-mentioned embodiments of the present disclosure.

It should be noted that those skilled in the art may understand all or some of the processes in the methods of the embodiments described above can be realized by using programs to instruct corresponding hardware. The programs may be stored in a computer readable storage medium. The storage medium may include read-only memory (ROM), random access memory (RAM), disk, compact disc (CD), or the like.

Figure 3:
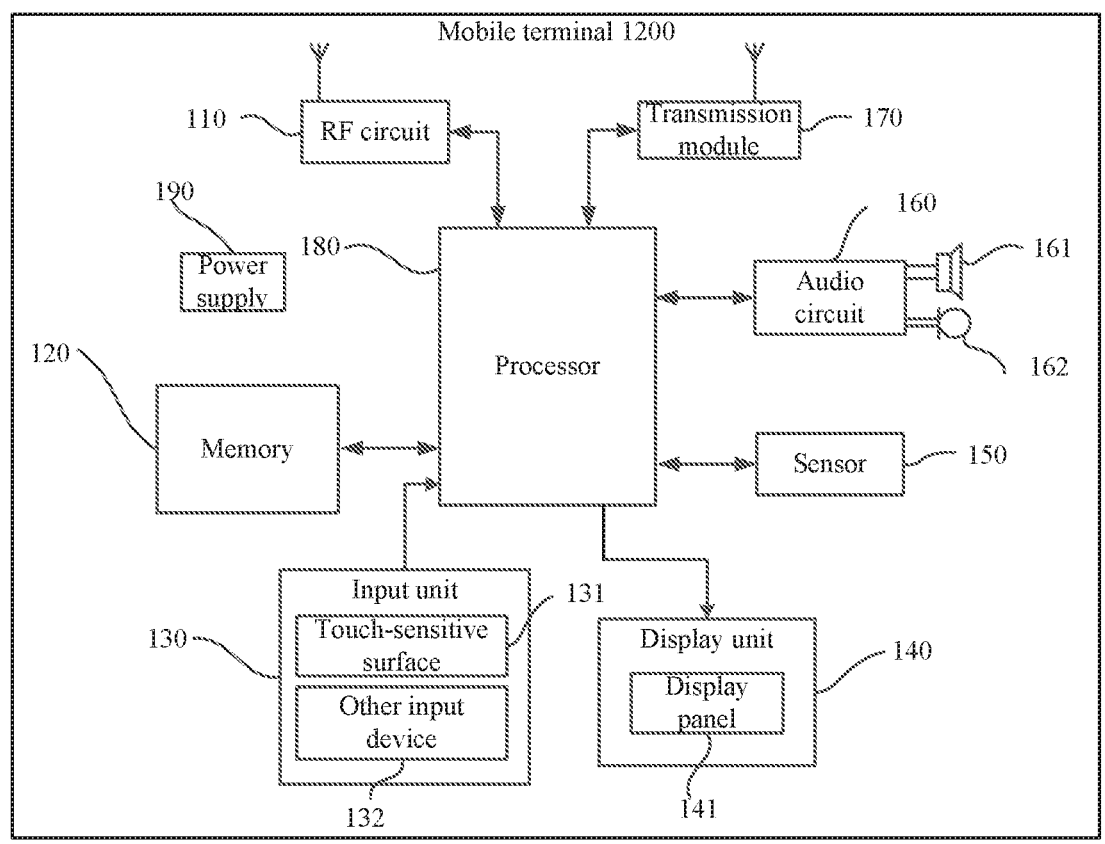
FIG. 3 illustrates a specific structure diagram of an embodiment of a mobile terminal provided by the present disclosure.

FIG. 3 illustrates a specific structure diagram of an embodiment of a mobile terminal provided by the present disclosure. The mobile terminal may be used to implement the application upgrade method of the mobile terminal provided by the above-mentioned embodiments. The mobile terminal 1200 may be a smart phone or a tablet computer.

As shown in FIG. 3, the mobile terminal 1200 may include a radio frequency (RF) circuit 110, a memory 120 including one or more computer readable storage mediums (only one is shown in FIG. 3), an input unit 130, a display unit 140, at least one sensor 150, an audio circuit 160, a transmission module 170, a processor 180 including one or more processing cores (only one is shown in FIG. 3), a power supply 190 and the like. Those skilled in the art can understand that the mobile terminal 1200 is not limited to the structure shown in FIG. 3, and may include more or fewer parts than those shown in FIG. 3, or some parts may be combined, or different arrangement of parts may be adopted.

The RF circuit 110 is configured to receive and transmit electromagnetic waves and to realize conversions of the electromagnetic waves and electrical signals, thereby communicating with a communication network or any other device. The RF circuit may include various conventional circuit elements used for performing these functions, for example, an antenna, a radio frequency transmitter, a digital signal processor, an encryption/decryption chip, a subscriber identification module (SIM) card, a memory and the like. The RF circuit 110 may communicate with various networks, for example, an internet, an intranet or a wireless network, or may communicate with any other device via a wireless network. The above-mentioned wireless network may include a cellular telephone network, a wireless local area network or a metropolitan area network. The above-mentioned wireless network may use various communication standards, protocols and technologies and may include but not limited to, Global System of Mobile Communication (GSM), Enhanced Data GSM Environment (EDGE), Wideband Code Division Multiple Access (WCDMA), Code Division Multiple Access (CDMA), Time Division Multiple Access (TDMA), Wireless Fidelity (Wi-Fi, for example, Institute of Electrical and Electronics Engineers (IEEE) 802.11a, IEEE 802.11b, IEEE 802.11g and/or IEEE 802.11n), Voice over Internet Protocol (VoIP) Worldwide Interoperability for Microwave Access (Wi-Max), other protocols for E-mail, instant messaging and Short Messaging Service (SMS) and other suitable communication protocols, and may include protocols which are not developed currently.

The memory 120 may be configured to store software programs and software modules, for example, the program instructions/modules corresponding to the application upgrade method of the mobile terminal in accordance with the above-mentioned embodiments. The processor 180 executes various functional applications and data processing by operating the software programs and the software modules stored in the memory 120. The memory 120 may include a high speed random access memory and also may include a non-volatile memory, such as one or more disk storage devices, a flash memory device or other non-volatile solid storage devices. In some embodiments, the memory 120 may further include a remote memory disposed corresponding to the processor 180. The remote memory may be connected to the mobile terminal 1200 via a network. Examples of the network include but are not limited to an internet, an intranet, a local area network, a mobile communication network and the combinations of them.

The input unit 130 may be configured to receive input number or character information and to generate keyboard, mouse, joystick, optical or trajectory ball signal inputs related to a user's setting and functional control. In detail, the input unit 130 may include a touch-sensitive surface 131 and other input device 132. The touch-sensitive surface 131, also called a touch display screen or a touch panel, may be configured to detect touch operations of a user on or near the touch-sensitive surface 131 (for example, operations carried out by the user through any suitable objects or attachments, such as a finger, a touch pen and the like, on the touch-sensitive surface 131 or near the touch-sensitive surface 131) and to drive a corresponding device connected therewith according to a preset program. Optionally, the touch-sensitive surface 131 may include a touch detection device and a touch controller. The touch detection device detects the touch direction of the user, detects a signal caused by the touch operation and transmits the signal to the touch controller. The touch controller receives touch information from the touch detection device, converts the touch information into a contact coordinate and then transmits the contact coordinate to the processor 180 and may receive a command transmitted by the processor 180 and execute the command. Moreover, the touch-sensitive surface 131 may be one of various types, such as a resistance type, a capacitance type, an infrared type, a surface acoustic wave type and the like. Besides the touch-sensitive surface 131, the input unit 130 also may include other input device 132. In detail, other input device 132 may include, but is not limited to, one or more of a physical keyboard, function keys (such as a volume control key, a switching key and the like), a trackball, a mouse, a joystick and the like.

The display unit 140 may be configured to display information input by the user or information provided for the user and various graphical user interfaces of the mobile terminal 1200. The graphical user interfaces may be constituted by graphics, texts, icons, videos and any combinations of them. The display unit 140 may include a display panel 141. Optionally, the display panel 141 may be configured in forms of a Liquid Crystal Display (LCD), an Organic Light-Emitting Diode (OLED) and the like. Furthermore, the touch panel 131 may cover the display panel 141. When the touch-sensitive surface 131 detects a touch operation on or near it, the signal caused by the touch operation is transmitted to the processor 180 to determine the type of a touch event. Then, the processor 180 provides a corresponding visual output on the display panel 141 according to the type of the touch event. In FIG. 3, the touch-sensitive surface and the display panel 141 are served as two independent parts for accomplishing input and output functions, however, in some embodiments, the touch-sensitive surface 131 and the display panel 141 may be integrated to accomplish the input and output functions.

The mobile terminal 1200 may further include at least one sensor 150, such as a gyroscope sensor, a magnetic induction sensor, an optical sensor, a motion sensor and other sensors. In detail, the optical sensor may include an environmental light sensor and a proximity sensor. The environmental light sensor may adjust brightness of the display panel 141 according to the lightness of environmental light. The proximity sensor may turn off the display panel 141 and/or backlight when the mobile terminal 1200 approaches an ear. As one type of the motion sensor, an accelerometer sensor may detect the value of an acceleration in each direction (generally in three axial directions), may detect the value and the direction of gravity in a static state, which may be used in posture identifying functions (such as switching between a horizontal screen and a vertical screen, switching related to a game, and calibration on the posture of a magnetometer), vibration identifying functions (such as for pedometer and striking) and the like. Furthermore, a gyroscope, a barometer, a humidity meter, a thermometer, an infrared sensor and other sensors may be integrated into the mobile terminal 1200, and explanations are not repeated herein.

The audio circuit 160, a speaker 161 and a microphone 162 may provide an audio interface between the user and the mobile terminal 1200. The audio circuit 160 may transmit an electric signal obtained by converting received audio data to the speaker 161. The electric signal is converted into a sound signal to be outputted by the speaker 161. On the other hand, the microphone 162 converts a collected sound signal into an electric signal. The audio circuit 160 receives the electric signal and converts the electric signal into audio data. After the audio data is outputted to the processor 180 and is processed, it is transmitted, for example, to another terminal through the RF circuit 110, or is outputted to the memory 120 in order to be further processed. The audio circuit 160 may further include an ear plug hole for providing communication between an external ear phone and the mobile terminal 1200.

The mobile terminal 1200 can help the user to receive and send E-mails, browse webpages, access streaming media and the like by the transmission module 170 (for example, a Wi-Fi module). The transmission module 170 provides wireless broadband internet access for the user. Although the transmission module 170 is shown in FIG. 3, it should be understood that the transmission module 170 is not the necessary part of the mobile terminal 1200 and may completely be omitted as required without changing the scope of the present disclosure.

The processor 180 is a control center of the mobile terminal 1200, is connected with all the parts of the whole mobile phone by various interfaces and lines and is configured to execute various functions of the mobile terminal 1200 and process the data by operating the software programs and/or the modules stored in the memory 120, and to call the data stored in the memory 120 so as to carry out integral monitoring on the mobile phone. Optionally, the processor 180 may include one or more processing cores. In some embodiments, the processor 180 may be integrated with an application processor and a modulation/demodulation processor. The application processor is mainly configured to process an operating system, at least one user interface, at least one application and the like. The modulation/demodulation processor is mainly configured to process wireless communication. It should be understood that the modulation/demodulation processor may also be not integrated into the processor 180.

The mobile terminal 1200 further includes the power supply 190 (such as a battery) for supplying power to each part. In some embodiments, the power supply may be logically connected with the processor 180 by a power supply management system, so as to implement functions of charge management, discharge management, power consumption management and the like by the power supply management system. The power supply 190 may further include one or more direct current or alternating current power supplies, recharging systems, power supply failure detection circuits, power converters or inverters, power supply status indicators and the like.

Although not shown in the FIG. 3, the mobile terminal 1200 may further include a camera (for example, a front camera or a rear camera), a BLUETOOTH module, and the like which are not further described herein. In the present embodiment, the display unit of the mobile terminal is a touch screen display, and the mobile terminal further includes a memory and one or more programs. The one or more programs are stored in the memory and configured to be executed by one or more processors. The one or more programs contain instructions for performing the following operations:

acquiring an update installation package of an application required to be upgraded and analyzing the update installation package by the mobile terminal;

acquiring an upgrade configuration file and an installation directory from the update installation package, modifying a unique identification of an application having a latest version, and adjusting a file level in the installation directory, wherein the unique identification is replaced by a Package Manager Service;

installing the application having the latest version, and generating a prompt window after a preset time for prompting whether to use the application having the latest version;

controlling the application having an old version to be uninstalled and retaining the application having the latest version, when it is decided to use the application having the latest version; and uninstalling the application having the latest version and retaining the application having the old version, when it is decided not to use the application having the latest version.

In the mobile terminal, the operation of modifying the unique identification of the application having the latest version specifically includes:

prefixing a package name of the application having the latest version with a timestamp string, so that the package name of the application having the latest version and a package name of the application having the old version are not repeated and do not conflict with each other.

In the mobile terminal, before the operations of acquiring the update installation package of the application required to be upgraded and analyzing the update installation package by the mobile terminal, the one or more programs further contain the instructions for performing:

acquiring a version number of the installed application regularly and determining whether it is necessary to upgrade the application required to be upgraded according to the version number of the application by the mobile terminal.

In the mobile terminal, the operations of acquiring the update installation package of the application required to be upgraded and analyzing the update installation package by the mobile terminal specifically include:

prompting a name of the application required to be upgraded for a user, when the mobile terminal determines that the application which has been installed on the mobile terminal is required to be upgraded;

receiving an operational command from the user and downloading the update installation package of the application required to be upgraded by the mobile terminal; and analyzing the downloaded update installation package.

In the mobile terminal, the operations of acquiring the upgrade configuration file and the installation directory from the update installation package, modifying the unique identification of the application having the latest version, and adjusting the file level in the installation directory specifically include:

acquiring the upgrade configuration file and the installation directory of the application having the latest version by analyzing the update installation package;

acquiring the unique identification configured to identify the application having the latest version from the upgrade configuration file, and modifying the unique identification of the application; and acquiring the installation directory of the application having the latest version from the upgrade configuration file, and adjusting the file level in the installation directory, so that the application having the latest version and the application having the old version are distinguished from each other and do not conflict with each other.

In the mobile terminal, the operations of installing the application having the latest version, and generating the prompt window after the preset time for prompting whether to use the application having the latest version specifically include:

setting the preset time;

installing the application having the latest version based on the modified upgrade configuration file; and generating the prompt window after the preset time for prompting the user whether to use the application having the latest version.

In the mobile terminal, the operation of controlling the application having the old version to be uninstalled and retaining the application having the latest version, when it is decided to use the application having the latest version, and the operation of uninstalling the application having the latest version and retaining the application having the old version, when it is decided not to use the application having the latest version specifically include:

uninstalling the application having the old version and retaining the application having the latest version, when the user decides to use the application having the latest version; and uninstalling the application having the latest version and retaining the application having the old version, when the user decides not to use the application having the latest version.

In the mobile terminal, the operation of uninstalling the application having the old version and retaining the application having the latest version, when the user decides to use the application having the latest version specifically includes:

overwriting the application having the old version with the application having the latest version totally, when the user decides to use the application having the latest version, so that the mobile terminal retains the application having the latest version.

In summary, the present disclosure provides an application upgrade method of a mobile terminal, a storage device, and a mobile terminal. The method includes: acquiring an update installation package of an application required to be upgraded and analyzing the update installation package by the mobile terminal; acquiring an upgrade configuration file and an installation directory from the update installation package, modifying a unique identification of an application having a latest version, and adjusting a file level in the installation directory; installing the application having the latest version, and generating a prompt window after a preset time for prompting whether to use the application having the latest version; controlling the application having an old version to be uninstalled and retaining the application having the latest version, when it is decided to use the application having the latest version; and uninstalling the application having the latest version and retaining the application having the old version, when it is decided not to use the application having the latest version. In the present disclosure, the upgrade configuration file and the installation directory are acquired from the update installation package. The unique identification of the application having the latest version is modified. The file level in the installation directory is adjusted. The application having the latest version and the application having the old version are distinguished from each other and do not conflict with each other. The application having the latest version can be served as a new application and installed. The application having the old version is uninstalled only when the user determines to use the application having the latest version in a long term. As such, the data loss can be avoided. Furthermore, the user can autonomously decide whether to continue to user the application having the latest version. This provides convenience for the user.

It should be understood that present disclosure is not limited to the exemplary examples. Those skilled in the art in the art may achieve equivalent improvements or replacements according to the above description. The equivalent improvements and replacements should be considered to belong to the protection scope of the present disclosure.

What is claimed is:

1. An application upgrade method of a mobile terminal, wherein the method comprises:
   acquiring an update installation package of an application required to be upgraded and having an old version, and analyzing the update installation package by the mobile terminal;
   acquiring an upgrade configuration file and an installation directory from the update installation package, modifying a unique identification of an application having a latest version, and adjusting a file level in the installation directory;
   installing the application having the latest version, and generating a prompt window after a preset time for prompting whether to use the application having the latest version;
   controlling the application required to be upgraded and having the old version to be uninstalled and retaining the application having the latest version, when it is decided to use the application having the latest version; and
   uninstalling the application having the latest version and retaining the application required to be upgraded and having the old version, when it is decided not to use the application having the latest version.

2. The application upgrade method of the mobile terminal of claim 1, wherein the unique identification is configured to identify the application having the latest version in the mobile terminal, and different applications have different unique identifications.

3. The application upgrade method of the mobile terminal of claim 1, wherein before the steps of acquiring the update installation package of the application required to be upgraded and having the old version, and analyzing the update installation package by the mobile terminal, the application upgrade method further comprises:
   acquiring a version number of the application required to be upgraded and having the old version regularly and determining whether it is necessary to upgrade the application required to be upgraded and having the old version according to the version number of the application required to be upgraded and having the old version by the mobile terminal.

4. The application upgrade method of the mobile terminal of claim 1, wherein the steps of acquiring the update installation package of the application required to be upgraded and having the old version, and analyzing the update installation package by the mobile terminal comprise:
   prompting a name of the application required to be upgraded and having the old version for a user, when the mobile terminal determines that the application required to be upgraded and having the old version is required to be upgraded;
   receiving an operational command from the user and downloading the update installation package of the application required to be upgraded and having the old version by the mobile terminal; and
   analyzing the downloaded update installation package.

5. The application upgrade method of the mobile terminal of claim 1, wherein the steps of acquiring the upgrade configuration file and the installation directory from the update installation package, modifying the unique identification of the application having the latest version, and adjusting the file level in the installation directory comprise:
   acquiring the upgrade configuration file and the installation directory of the application having the latest version by analyzing the update installation package;
   acquiring the unique identification configured to identify the application having the latest version from the upgrade configuration file, and modifying the unique identification of the application having the latest version; and
   acquiring the installation directory of the application having the latest version from the upgrade configuration file, and adjusting the file level in the installation directory, so that the application having the latest version and the application required to be upgraded and having the old version are distinguished from each other and do not conflict with each other.

6. The application upgrade method of the mobile terminal of claim 1, wherein the steps of installing the application having the latest version, and generating the prompt window after the preset time for prompting whether to use the application having the latest version comprise:
   setting the preset time;
   installing the application having the latest version based on the modified upgrade configuration file; and
   generating the prompt window after the preset time for prompting a user whether to use the application having the latest version.

7. The application upgrade method of the mobile terminal of claim 1, wherein the steps of controlling the application required to be upgraded and having the old version to be uninstalled and retaining the application having the latest version, when it is decided to use the application having the latest version, and the steps of uninstalling the application having the latest version and retaining the application required to be upgraded and having the old version, when it is decided not to use the application having the latest version comprise:
   uninstalling the application required to be upgraded and having the old version and retaining the application having the latest version, when a user decides to use the application having the latest version; and
   uninstalling the application having the latest version and retaining the application required to be upgraded and having the old version, when the user decides not to use the application having the latest version.

8. The application upgrade method of the mobile terminal of claim 7, wherein the steps of uninstalling the application required to be upgraded and having the old version and retaining the application having the latest version, when the user decides to use the application having the latest version comprises:
   overwriting the application required to be upgraded and having the old version with the application having the latest version totally, when the user decides to use the application having the latest version, so that the mobile terminal retains the application having the latest version.

9. A non-transitory storage device, storing instructions, wherein the instructions are loaded and executed by a processor of a mobile terminal to perform steps of:

acquiring an update installation package of an application required to be upgraded and having an old version, and analyzing the update installation package by the mobile terminal;

acquiring an upgrade configuration file and an installation directory from the update installation package, modifying a unique identification of an application having a latest version, and adjusting a file level in the installation directory;

installing the application having the latest version, and generating a prompt window after a preset time for prompting whether to use the application having the latest version;

controlling the application required to be upgraded and having the old version to be uninstalled and retaining the application having the latest version, when it is decided to use the application having the latest version; and uninstalling the application having the latest version and retaining the application required to be upgraded and having the old version, when it is decided not to use the application having the latest version.

10. The non-transitory storage device of claim 9, wherein the steps of acquiring the update installation package of the application required to be upgraded and having the old version, and analyzing the update installation package by the mobile terminal comprise:

prompting a name of the application required to be upgraded and having the old version for a user, when the mobile terminal determines that the application required to be upgraded and having the old version is required to be upgraded;

receiving an operational command from the user and downloading the update installation package of the application required to be upgraded and having the old version by the mobile terminal; and analyzing the downloaded update installation package.

11. The non-transitory storage device of claim 9, wherein the steps of acquiring the upgrade configuration file and the installation directory from the update installation package, modifying the unique identification of the application having the latest version, and adjusting the file level in the installation directory comprise:

acquiring the upgrade configuration file and the installation directory of the application having the latest version by analyzing the update installation package;

acquiring the unique identification configured to identify the application having the latest version from the upgrade configuration file, and modifying the unique identification of the application having the latest version; and acquiring the installation directory of the application having the latest version from the upgrade configuration file, and adjusting the file level in the installation directory, so that the application having the latest version and the application required to be upgraded and having the old version are distinguished from each other and do not conflict with each other.

12. The non-transitory storage device of claim 9, wherein the steps of installing the application having the latest version, and generating the prompt window after the preset time for prompting whether to use the application having the latest version comprise:

setting the preset time;

installing the application having the latest version based on the modified upgrade configuration file; and generating the prompt window after the preset time for prompting a user whether to use the application having the latest version.

13. A mobile terminal, comprising a processor and a storage device communicating with and connected to the processor, wherein the storage device is configured to store instructions, and the processor is configured to call the instructions in the storage device to perform steps of:

acquiring an update installation package of an application required to be upgraded and having an old version, and analyzing the update installation package by the mobile terminal;

acquiring an upgrade configuration file and an installation directory from the update installation package, modifying a unique identification of an application having a latest version, and adjusting a file level in the installation directory, wherein the unique identification is replaced by a Package Manager Service;

installing the application having the latest version, and generating a prompt window after a preset time for prompting whether to use the application having the latest version;

controlling the application required to be upgraded and having the old version to be uninstalled and retaining the application having the latest version, when it is decided to use the application having the latest version; and uninstalling the application having the latest version and retaining the application required to be upgraded and having the old version, when it is decided not to use the application having the latest version.

14. The mobile terminal of claim 13, wherein the step of modifying the unique identification of the application having the latest version comprises:

prefixing a package name of the application having the latest version with a timestamp string, so that the package name of the application having the latest version and a package name of the application required to be upgraded and having the old version are not repeated and do not conflict with each other.

15. The mobile terminal of claim 13, wherein before the steps of acquiring the update installation package of the application required to be upgraded and having the old version, and analyzing the update installation package by the mobile terminal, the processor is further configured to call the instructions in the storage device to perform:

acquiring a version number of the application required to be upgraded and having the old version regularly and determining whether it is necessary to upgrade the application required to be upgraded and having the old version according to the version number of the application by the mobile terminal.

16. The mobile terminal of claim 13, wherein the steps of acquiring the update installation package of the application required to be upgraded and having the old version, and analyzing the update installation package by the mobile terminal comprise:

prompting a name of the application required to be upgraded and having the old version for a user, when the mobile terminal determines that the application required to be upgraded and having the old version is required to be upgraded;

receiving an operational command from the user and downloading the update installation package of the application required to be upgraded and having the old version by the mobile terminal; and analyzing the downloaded update installation package.

17. The mobile terminal of claim 13, wherein the steps of acquiring the upgrade configuration file and the installation directory from the update installation package, modifying the unique identification of the application having the latest version, and adjusting the file level in the installation directory comprise:

acquiring the upgrade configuration file and the installation directory of the application having the latest version by analyzing the update installation package;

acquiring the unique identification configured to identify the application having the latest version from the upgrade configuration file, and modifying the unique identification of the application; and acquiring the installation directory of the application having the latest version from the upgrade configuration file, and adjusting the file level in the installation directory, so that the application having the latest version and the application required to be upgraded and having the old version are distinguished from each other and do not conflict with each other.

18. The mobile terminal of claim 13, wherein the steps of installing the application having the latest version, and generating the prompt window after the preset time for prompting whether to use the application having the latest version comprise:

setting the preset time;

installing the application having the latest version based on the modified upgrade configuration file; and generating the prompt window after the preset time for prompting a user whether to use the application having the latest version.

19. The mobile terminal of claim 13, wherein the step of controlling the application required to be upgraded and having the old version to be uninstalled and retaining the application having the latest version, when it is decided to use the application having the latest version, and the operation of uninstalling the application having the latest version and retaining the application required to be upgraded and having the old version, when it is decided not to use the application having the latest version comprise:

uninstalling the application required to be upgraded and having the old version and retaining the application having the latest version, when a user decides to use the application having the latest version; and uninstalling the application having the latest version and retaining the application required to be upgraded and having the old version, when the user decides not to use the application having the latest version.

20. The mobile terminal of claim 19, wherein the steps of uninstalling the application required to be upgraded and having the old version and retaining the application having the latest version, when the user decides to use the application having the latest version comprises:

overwriting the application required to be upgraded and having the old version with the application having the latest version totally, when the user decides to use the application having the latest version, so that the mobile terminal retains the application having the latest version.

* * * * *